United States Patent [19]
Amemiya et al.

[11] Patent Number: 5,584,294
[45] Date of Patent: Dec. 17, 1996

[54] METHOD AND APPARATUS FOR ULTRASONIC BLOOD FLOW DISPLAY

[75] Inventors: Shinichi Amemiya; Taiho Ri; Takao Jibiki, all of Tokyo, Japan

[73] Assignee: GE Yokogawa Medical Systems, Limited, Tokyo, Japan

[21] Appl. No.: 541,539

[22] Filed: Oct. 10, 1995

[51] Int. Cl.⁶ ........................................ A61B 8/00
[52] U.S. Cl. ........................................ 128/660.05
[58] Field of Search ................ 128/660.04, 660.05, 128/660.07, 661.08, 661.09, 661.10, 660.01

[56] References Cited

U.S. PATENT DOCUMENTS

| | | | |
|---|---|---|---|
| 4,448,200 | 5/1984 | Brooks et al. | 128/660.01 |
| 4,790,321 | 12/1988 | Miwa et al. | 128/660.07 |
| 5,181,513 | 1/1993 | Touboul et al. | 128/660.07 |

*Primary Examiner*—George Manuel
*Attorney, Agent, or Firm*—Moonray Kojima

[57] ABSTRACT

In a power Doppler ultrasonic blood flow display apparatus, according to a moving signal Z representing moving of a blood flow display region, display changing means comprising changers (77, 78) and a change controller (79) displays a B-mode image also to a blood flow display region (84) while the blood flow display region (84) is moved, and displays a blood flow image when the moving of the blood flow display region (84) is stopped. Consequently the B-mode image of the target can be easily caught even while the blood flow display region is moved.

2 Claims, 5 Drawing Sheets

82 B-MODE IMAGE DISPLAY REGION
81 DISPLAY SURFACE
83 TUMOR IMAGE
84 BLOOD FLOW DISPLAY REGION

METHOD AND APPARATUS FOR ULTRASONIC BLOOD FLOW DISPLAY

BACKGROUND OF THE INVENTION

In medical ultrasonic imaging apparatuses, ultrasonic wave is irradiated into an object to be examined and two-dimensional distribution of blood flow is displayed in a color image by power of a Doppler signal. Being different from a method of displaying blood flow by frequency of a Doppler signal, a method of displaying blood flow by power of a Doppler signal cannot display direction and speed of blood flow or speed dispersion but has unique function that existence of blood flow and its strength can be displayed at high sensitivity and high S/N ratio. In view of the unique function, this method becomes one of useful blood flow display methods.

In such an apparatus, as described in reference "Diagnostic Imaging", December 1993, pp 66–69, a blood flow display region is provided in a part of a B-mode image display region and a blood flow image is displayed in the blood flow display region. The blood flow display region can be moved freely in the B-mode image display region using an operation device, thereby a blood flow image in a desired region under study can be displayed.

The blood flow image is displayed by color corresponding to power of a Doppler signal, for example, by violet, red, orange, yellow in the rising order of the power. A portion without blood flow is displayed by color other than the above, e.g., by blue, and can be clearly distinguished from a portion with blood flow. Since a blood flow image by power of a Doppler signal has a good S/N ratio, a portion without blood flow is colored entirely with uniform blue.

Therefore as shown in FIG. 6 for example, when a tumor image 83 is displayed in a B-mode image display region 82 on a display surface 81 of an image display, in the case that a blood flow display region 84 is moved to a portion including the tumor image 83 so as to display blood flow of the portion, if the blood flow display region 84 overlaps with the tumor image 83 on the way of the moving as shown in FIG. 7, the tumor image 83 is hidden and comes out of sight and the target cannot be confirmed.

In general, since an ultrasonic transducer, e.g., an ultrasonic probe is made touch an object to be examined by an operator, its direction is liable to vary. Therefore the deviation of the direction of the transducer must be corrected while viewing the screen, so that the tumor image 83 always appears on the display surface. However, if the target comes out of sight at the way of the moving as above described, even when the direction of the transducer is deviated, it cannot be corrected. Consequently it becomes unclear that the blood flow displayed on the blood flow display region 84 be blood flow at the desired portion certainly.

SUMMARY OF THE INVENTION

The present invention is in a method and an apparatus for ultrasonic blood flow display, where when a blood flow image in a power Doppler mode is displayed to a part of a B-mode image display region by ultrasonic wave, the B-mode image is displayed in place of the blood flow image while the blood flow display region is moved, and the blood flow image is displayed while the blood flow display region is stopped.

An object of the present invention is to realize a method and an apparatus for ultrasonic blood flow display where a B-mode image of a target can be easily caught even while a blood flow display region is moved.

The first invention is in a method for ultrasonic blood flow display where a blood flow image by power of an ultrasonic Doppler signal is displayed to a blood flow display region movable within a B-mode image display region, characterized in that the B-mode image is displayed within the blood flow display region while the blood flow display region is moved.

The second invention is in an apparatus for ultrasonic blood flow display comprising B-mode image forming means for forming a B-mode image based on an ultrasonic echo signal, blood flow image forming means for forming a blood flow image based on power of an ultrasonic Doppler signal, display means for displaying the B-mode image formed by the B-mode image forming means, and for displaying the blood flow image formed by the blood flow image forming means to the blood flow display region formed within the B-mode image display region, moving means for moving the blood flow display region, and display changing means for displaying the B-mode image within the blood flow display region while the blood flow display region is moved.

In the first invention, the B-mode image is displayed in the blood flow display region while the blood flow display region is moved, and the blood flow image is displayed in the blood flow display region when its moving is stopped.

In the second invention, according to the display changing means, the B-mode image is displayed in the blood flow display region while the blood flow display region is moved, and the blood flow image is displayed in the blood flow display region when its moving is stopped.

DESCRIPTION OF THE PREFERRED EMBODIMENT

Figure 1:
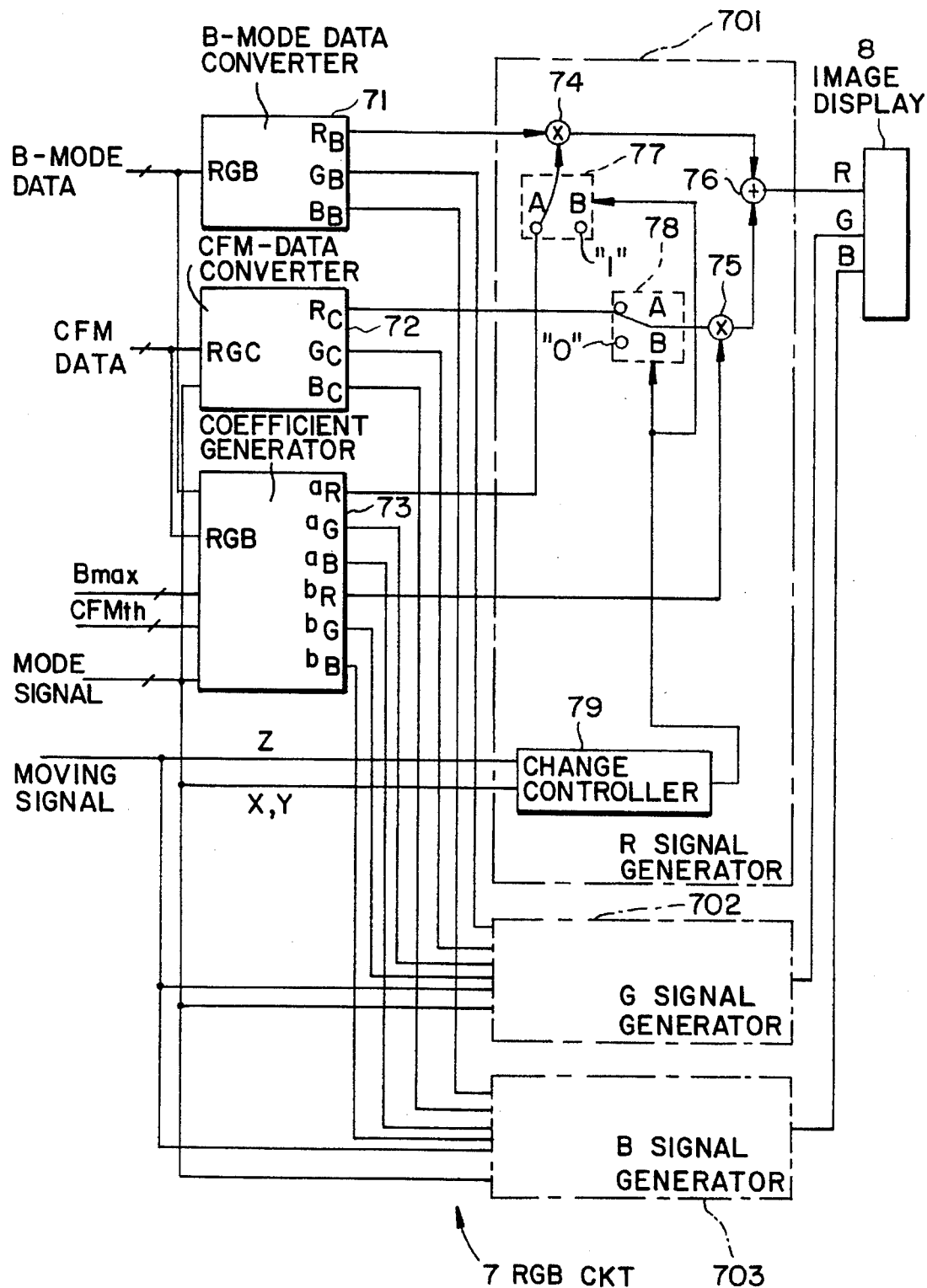
FIG. 1 is a block diagram showing configuration of main part of an apparatus in an embodiment of the invention.
Figure 2:
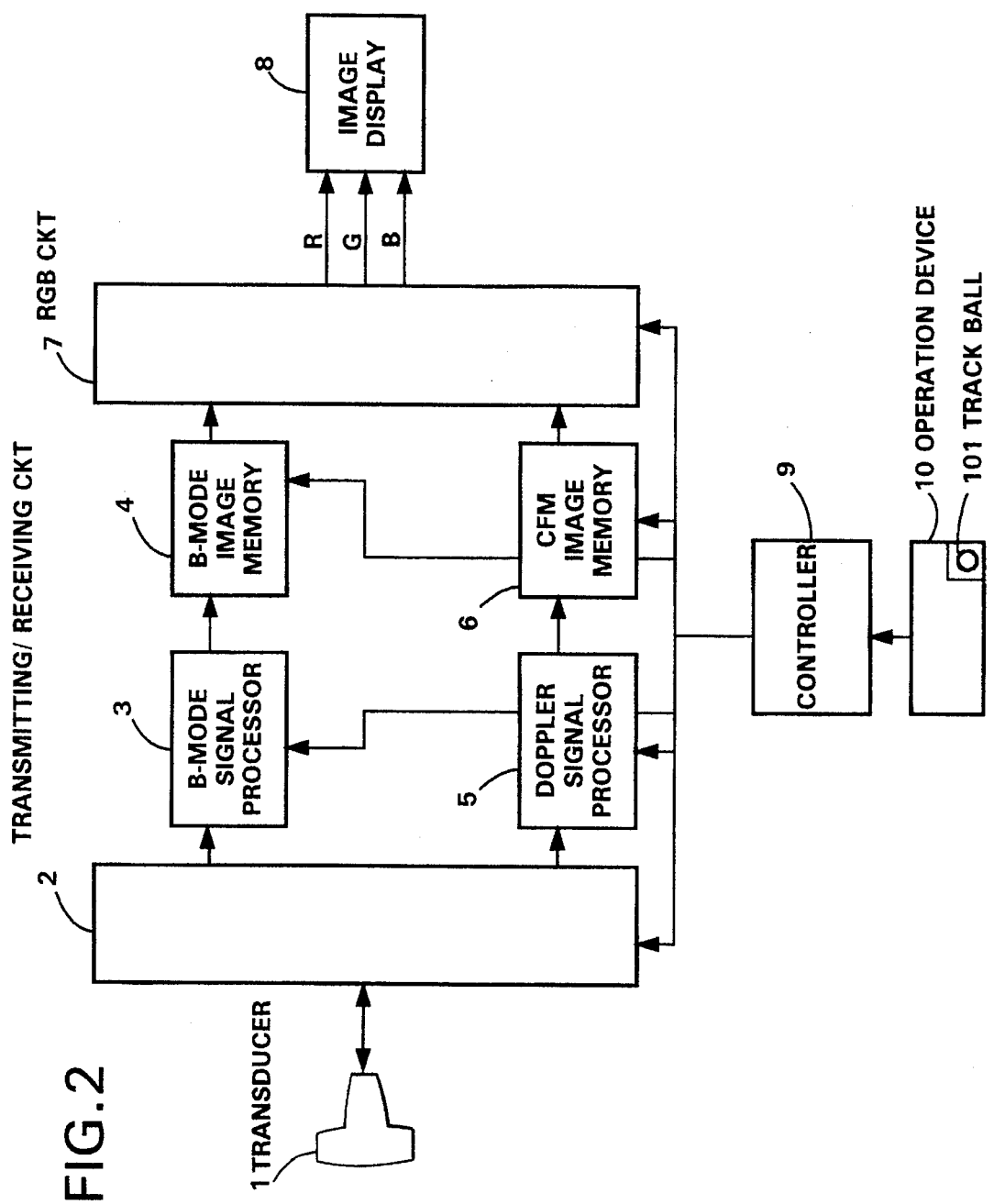
FIG. 2 is a block diagram showing whole configuration of an apparatus in an embodiment of the invention.

An embodiment of the present invention will be described in detail referring to the accompanying drawings as follows. In addition, the present invention is not limited by the embodiment. FIG. 1 is a block diagram showing configuration of main part of an apparatus in the embodiment of the present invention, and FIG. 2 is a block diagram showing whole configuration. In addition, a method of the embodiment of the present invention is shown in operation of the apparatus in the embodiment of the present invention.

First, explaining the whole configuration, in FIG. 2, numeral 1 designates a transducer, numeral 2 designates a transmitting/receiving circuit, numeral 3 designates a B-mode signal processor, numeral 4 designates a B-mode image memory, numeral 5 designates a Doppler signal processor, numeral 6 designates a CFM image memory, numeral 7 designates an RGB circuit, numeral 8 designates an image display, numeral 9 designates a controller, numeral 10 designates an operation device, and numeral 101 designates a track ball.

The transducer 1 is an ultrasonic probe for example, which is made touch an object to be examined (not shown) and irradiates ultrasonic wave into the object to be examined under control by the controller 9 according to a drive signal supplied from the transmitting/receiving circuit 2 and detects an echo signal returned from the inside of the object to be examined. The transmitting/receiving circuit 2 supplies a drive signal to the transducer 1, and receives and amplifies detected echo signals and inputs the signals to the B-mode signal processor 3 and the Doppler signal processor 5 respectively.

The B-mode signal processor 3 processes an echo signal supplied from the transmitting/receiving circuit 2 under control by the controller 9, and prepares image data for B-mode image display and writes the data in the B-mode image memory 4. In this embodiment, the B-mode signal processor 3 corresponds to the B-mode image forming means in the present invention.

The Doppler signal processor 5 processes an echo signal supplied from the transmitting/receiving circuit 2 by a pulse Doppler method under control by the controller 9, and prepares image data for displaying a CFM (Color Flow Mapping) image regarding blood flow dynamic state, i.e., respective image data (CFM data) representing rate of blood flow, power of the Doppler signal, dispersion of the blood flow rate or the like and writes the data in the CFM image memory 6. In this embodiment, the Doppler signal processor 5 corresponds to the blood flow image forming means in the present invention.

The image data written in the B-mode image memory 4 and the CFM image memory 6 respectively are read out under control by the controller 9, and converted into a plurality of color element signals for color display, e.g., RGB (Red, Green, Blue) signals by the RGB circuit 7 and supplied to the image display 8 and displayed as images there. In this embodiment, the RGB circuit 7 and the image display 8 correspond to the display means in the present invention.

The operation device 10 controls operation of the apparatus of this embodiment by operating the controller 9. The operation device 10 is provided with a track ball 101 for moving a cursor or the like on the display surface of the image display 8. The track ball 101 is operated also when the blood flow display region is moved. In this embodiment, the operation device 10 having the track ball 101 corresponds to the moving means in the present invention.

FIG. 1 is a detailed block diagram of the RGB circuit 7. In FIG. 1, numeral 71 designates a B-mode data RGB converter, numeral 72 designates a CFM data RGB converter, numeral 73 designates an RGB coefficient generator, and numerals 701, 702 and 703 designate an R signal generator, a G signal generator and a B signal generator respectively.

The B-mode data RGB converter 71 converts B-mode data read out of the B-mode image memory 4 into RGB signals, and the CFM data RGB converter 72 converts CFM data read out of the CFM image memory 6 into RGB signals.

The RGB coefficient generator 73 generates coefficients of the RGB signals regarding the B-mode data and the CFM data respectively. The coefficients of the RGB signals of the B-mode data are $a_R$, $a_G$, $a_B$, and the coefficients of the RGB signals of the CFM data are $b_R$, $b_G$, $b_B$. Values of these coefficients are determined in range of 0 to 1.

Generation of these coefficients is determined according to the B-mode data, the CFM data, the threshold value $B_{max}$, the threshold value $CFM_{TH}$ and mode signals, for example, by logic of following items (1), (2), (3). In addition, the threshold value $B_{max}$, the threshold value $CFM_{TH}$ and the mode signals are supplied from the controller 9.

(1) When values of the B-mode data exceed the prescribed threshold value $B_{max}$, the coefficients $a_R$, $a_G$, $a_B$ are all made 1 and the coefficients $b_R$, $b_G$, $b_B$ are all made 0. In addition, the threshold value $B_{max}$ is provided so that the blood flow display for movement of organization of the object to be examined, i.e, for clutter component is prevented and artifact is not produced. The threshold value $B_{max}$ is adjusted by the controller 9.

(2) When values of the B-mode data are prescribed threshold value $B_{max}$ or less and power values represented by the CFM data are the prescribed threshold value $CFM_{TH}$ or more, the coefficients $a_R$, $a_G$, $a_B$ are all made 0 and the coefficients $b_R$, $b_G$, $b_B$ are all made 1. In addition, the threshold value $CFM_{TH}$ in power display is provided in order to discriminate whether the portion during the signal processing is mainly the blood flow region ($CFM_{TH}$ or more) or the organization region (less than $CFM_{TH}$). The threshold value $CFM_{TH}$ is adjusted by the controller 9.

(3) Otherwise, corresponding to the display mainly composed of B-mode images, the display mainly composed of CFM images or the display by compromise between both images, for example, ($a_R=a_G=a_B=1$, $b_R=b_G=b_B=0$), ($a_R=a_G=a_B=0$, $b_R=b_G=b_B=1$) or ($a_R=a_G=a_B=0.6$, $b_R=b_G=b_B=0.3$) is selected respectively. It is previously assigned which display should be selected.

Relation between logic of such items (1), (2), (3) and the image display will be described in detail in the later operation explanation. In addition, the RGB coefficient generator 73 having the logic function of the above-mentioned (1), (2), (3) is preferably constituted by the logic circuit of hardware from the viewpoint that the operation speed can be made high speed. However, the same function can be implemented by a program of a micro computer or the like. This case is advantageous in that the measure to changing, revision or the like becomes easy.

The R signal generator 701 comprises multipliers 74, 75, an adder 76, changers 77, 78 and a change controller 79.

The multiplier 74 multiplies the R signal $R_B$ of the B-mode data outputted from the B-mode data RGB converter 71 by the output coefficient $a_R$ of the RGB coefficient generator 73 or the fixed coefficient 1 supplied through the changer 77.

The multiplier 75 multiplies the R signal $R_C$ of the CFM data from the CFM data RGB changer 72 or the fixed data 0 supplied through the changer 78 by the output coefficient $b_R$ of the RGB coefficient generator 73.

The adder 76 adds output signals of these multipliers 74, 75, and supplies the result as the R signal for display to the image display 8.

The change controller 79 controls changing of the changers 77, 78, and the control of the changing is carried out according to a mode signal and a moving signal supplied from the controller 9. In addition, the moving signal is a signal indicating that the blood flow display region is being moved.

The mode signal is a signal representing, for example, four sorts of modes, i.e., B mode, speed mode, power mode and dispersion mode, in two bits, and the moving signal is a signal representing whether the blood flow display region is being moved or not in one bit.

Based on these signals, the change controller 79 controls changing of the changers 77, 78 according to logic of following items (4), (5), (6).

(4) When the mode signal indicates the B mode, the changers 77, 78 are changed to the side of the contact B.

(5) When the mode signal indicates the power mode and the moving signal indicates "moving", the changers 77, 78 are changed to the side of the contact B.

(6) Otherwise, the changers 77, 78 are changed to the side of the contact A.

Table 1 shows relation between input signals and output signals of such a change controller 79.

TABLE 1

| mode | movement XY[Z] | moving 1 | not moving 0 |
|---|---|---|---|
| B | 00 | 1 | 1 |
| speed | 01 | 0 | 0 |
| power | 11 | 1 | 0 |
| dispersion | 10 | 0 | 0 |

Table 1 shows logic values of the output signal Q of the change controller 79 to logic values of the input signals X, Y of two bits representing modes and the input signal Z of one bit representing moving of the blood flow display region. In addition, Q=0 indicates a changing signal to the side of the contact A, and Q=1 indicates a changing signal to the side of the contact B.

Logical expression of the output signal Q satisfying Table 1 is shown by following formula 1.

Formula 1

$$Q = \bar{X}\bar{Y} + XYZ$$

The G signal generator 702 and the B signal generator 703 also have similar configuration to that of the R signal generator 701, and generate the G signal and the B signal for display respectively and supply the signals to the image display 8.

The R signal generator 701, the G signal generator 702 and the B signal generator 703 are preferably constituted by the logical circuit of hardware from the viewpoint that the operation speed can be made high speed, but the same function as that of the multipliers 74, 75, the adder 76, the changers 77, 78 and the change controller 79 can be implemented by the program of the micro computer or the like. This case is advantageous in that the measure to changing, revision or the like becomes easy.

Figure 3:
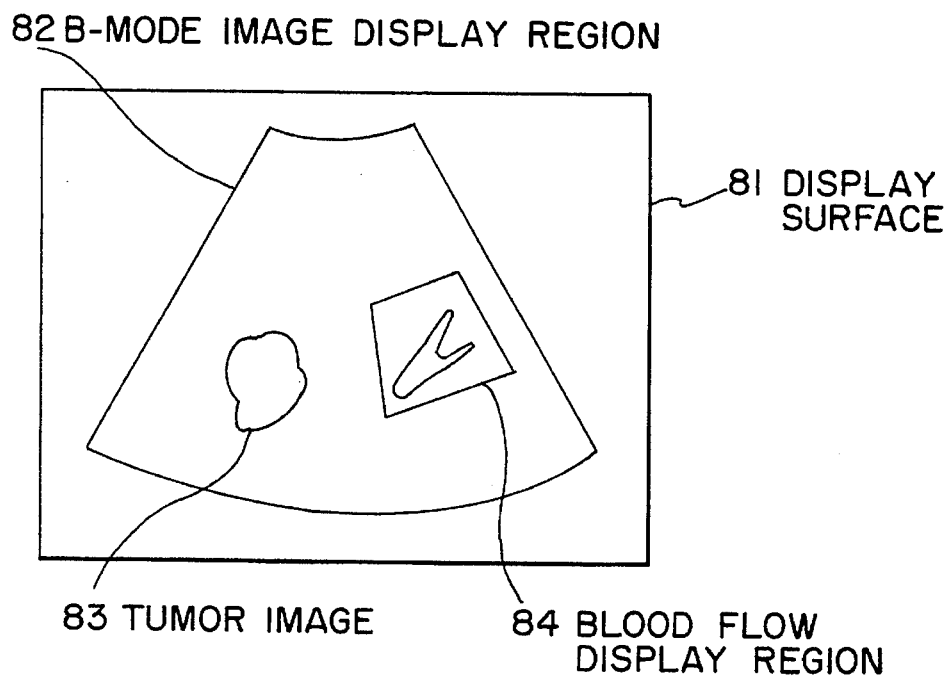
FIG. 3 is an operation explanation diagram of an apparatus in an embodiment of the invention.
Figure 4:
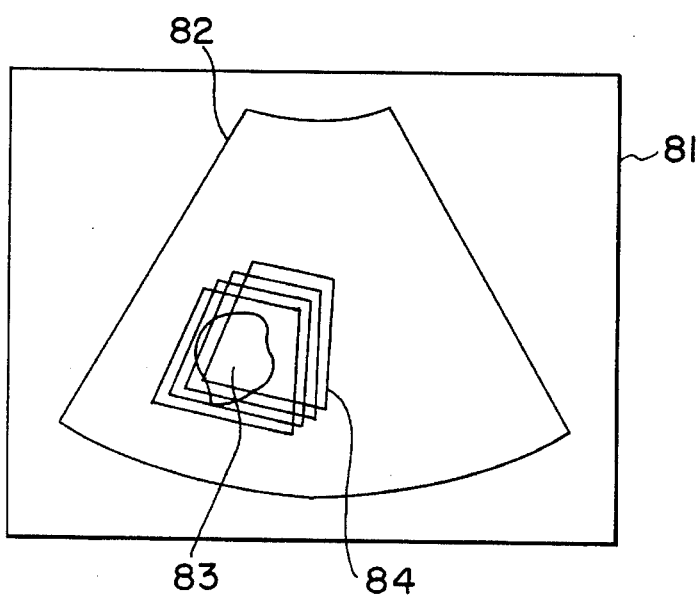
FIG. 4 is an operation explanation diagram of an apparatus in an embodiment of the invention.
Figure 5:
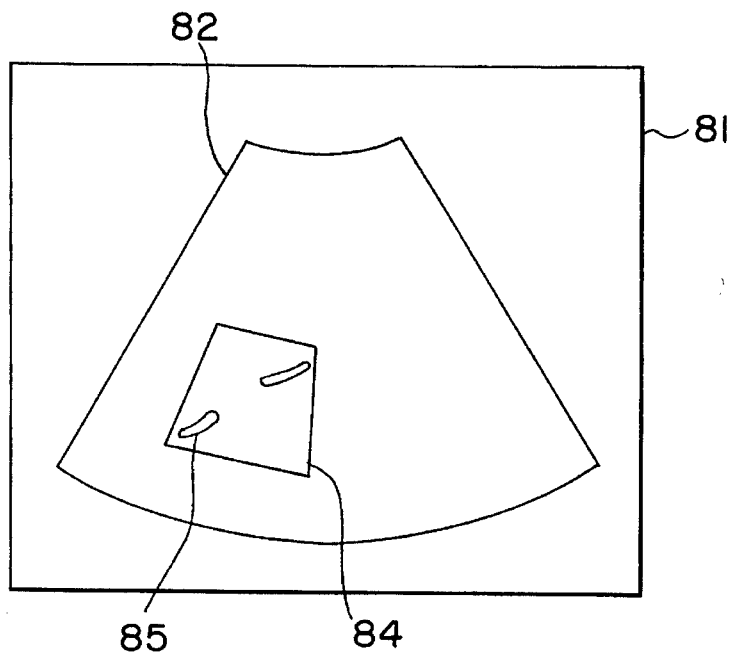
FIG. 5 is an operation explanation diagram of an apparatus in an embodiment of the invention.
Figure 6:
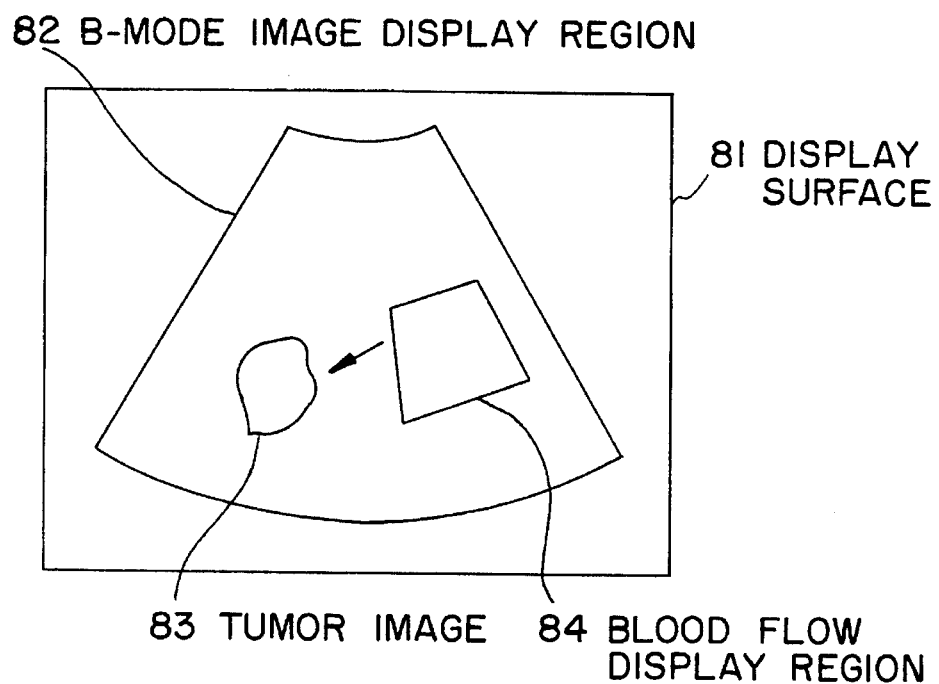
FIG. 6 is an operation explanation diagram of an apparatus in the prior art.
Figure 7:
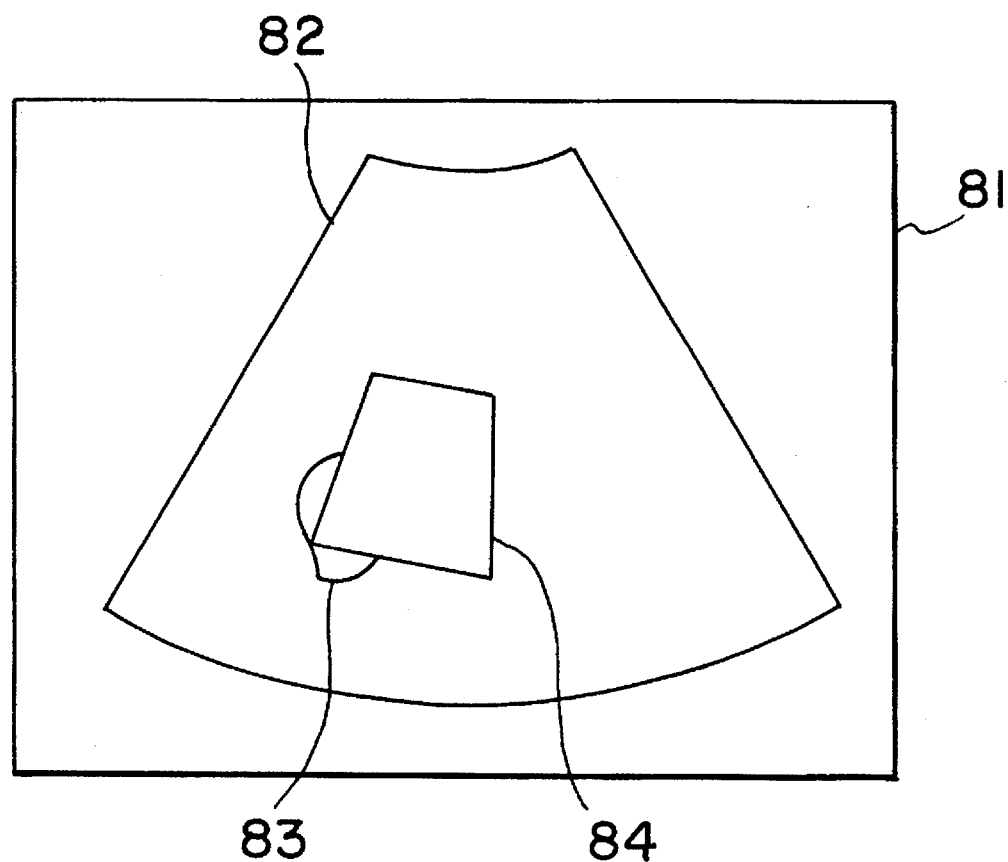
FIG. 7 is an operation explanation diagram of an apparatus in the prior art.

Operation of the apparatus in such configuration will be described as follows. FIGS. 3 to 5 are diagrams showing an example of image display by the apparatus in the embodiment of the present invention. In addition, these diagrams show also an example of image display by the method in the embodiment of the present invention.

First as shown in FIG. 3, in the display surface 81 of the image display 8, state of displaying the B-mode image to the B-mode image display region 82 and carrying out the blood flow display of the power mode to the blood flow display region 84 will be described. In addition, the blood flow display region 84 is clearly indicated by contour line on the screen.

The state of FIG. 3 is the power mode, but when the blood flow display region 84 is stopped, in the R signal generator 701 of the RGB circuit 7, the changers 77, 78 are changed to the side of the contact A by the controller 79.

Therefore the multiplier 74 multiplies the output signal $R_B$ of the B-mode data RGB converter 71 by the output coefficient $a_R$ Of the RGB coefficient generator 73, and the multiplier 75 multiplies the output signal $R_C$ of the CFM data RGB converter 72 by the output coefficient $b_R$ of the RGB coefficient generator 73, and the output signals of these two multipliers 74, 75 are added by the adder 76 and supplied as the R signal for display to the image display 8.

The G signal generator 702 and the B signal generator 703 also are in similar operation state and form the G signal and the B signal for display respectively, which are supplied to the image display 8.

Since the RGB coefficient generator 73 generate the coefficient $a_R$, $a_G$, $a_B$ and the coefficients $b_R$, $b_G$, $b_B$ according to the logic of (1) to (3), the image display 8 is supplied with following RGB signals.

(1)' When values of the B-mode data exceed the threshold value $B_{max}$, since the coefficients $a_R$, $a_G$, $a_B$ are all 1 and the coefficients $b_R$, $b_G$, $b_B$ are all 0, in the R signal generator 701, the output signal $R_B$ of the B-mode data RGB converter 71 is multiplied by 1 in the multiplier 74, and the output signal $R_C$ of the CFM data RGB converter 72 is multiplied by 0 in the multiplier 75. As a result, the output signal of the adder 76 becomes the R signal by only the B mode data. The G signal generator 702 and the B signal generator 703 also output the G signal and the B signal by only the B-mode data respectively. Consequently the B-mode image is displayed in the image display 8.

(2)' When values of the B-mode data are the threshold value $B_{max}$ or less and power values of blood flow represented by the CFM data are the threshold value $CFM_{TH}$ or more, since the coefficients $a_R$, $a_G$, $a_B$ are all 0 and the coefficients $b_R$, $b_G$, $b_B$ are all 1, in the R signal generator 701, the output signal $R_B$ of the B-mode data RGB converter 71 is multiplied by 0 in the multiplier 74, and the output signal $R_C$ of the CFM data RGB converter 72 is multiplied by 1 in the multiplier 75. As a result, the output signal of the adder 76 becomes the R signal by only the CFM data. The G signal generator 702 and the B signal generator 703 also output the G signal and the B signal by only the CFM data respectively. Consequently the blood flow image is displayed in the image display 8.

(3)' When values of the B mode data are the threshold value $B_{max}$ or less and power values of blood flow represented by the CFM data are less than the threshold value $CFM_{TH}$, corresponding to the display mainly composed of B-mode images, the display mainly composed of CFM images or the display by compromise between both images, each coefficient becomes, for example, ($a_R=a_G=a_B=1$, $b_R=b_G=b_B=0$), ($a_R=a_G=a_B=0$, $b_R=b_G=b_B=1$) or ($a_R=a_G=a_B=0.6$, $b_R=b_G=b_B=0.3$) respectively. Consequently, in the image display 8, only the B-mode image is displayed in the display mainly composed of B-mode images, and only the blood flow image is displayed in the display mainly composed of CFM images, and the B-mode image and the blood flow image are displayed to overlap each other in semitransparent state in the display by compromise between both images.

Thus, since the RGB signal of the B mode data and the RGB signal of the CFM data are added with the output coefficient of the RGB coefficient generator 73 and becomes the RGB signals for image display, the displayed image as shown in FIG. 3 displays the B-mode image including the tumor image 83 in the B-mode image display region 82 and displays the blood flow image in the blood flow display region 84.

Next, description will be done regarding the case that the track ball 101 is operated and the blood flow display region 84 is moved to the portion of the tumor image 83 and the blood flow of the portion is displayed.

If the blood flow display region 84 is moved, since the moving signal indicates "moving" during the moving, the change controller 79 changes the changers 77, 78 to the side of the contact B. Thereby since the multiplier 74 multiplies the output $R_B$ of the B-mode data RGB converter 71 by the fixed coefficient 1 and the multiplier 75 multiplies the fixed data 0 by the coefficient $b_R$, the output signal of the adder 76 becomes only the R signal of the B-mode image. Also in the G signal generator 702 and the B signal generator 703, similar operation is carried out and the G signal and the B signal of the B-mode image are outputted respectively.

Therefore display of the blood flow is inhibited and the B-mode image is displayed also in the blood flow display region 84. Consequently as shown in FIG. 4, even if the blood flow display region 84 being moved overlaps with the tumor image 83, since the tumor image 83 appears, the target does not come out of sight. That is, effect is obtained in that the B-mode image of the target can be easily caught even while the blood flow display region 84 is moved.

Also even if the direction of the transducer 1 is deviated at the way of moving and the tumor image 83 disappears, the direction is searched while viewing the screen, thereby the tumor image 83 of the target can be projected again. That is, effect is obtained in that the correct direction of the transducer 1 can be easily secured while the blood flow display region 84 is moved.

If the tumor image 83 of the target entirely enters the blood flow display region 84, then operation of the track ball 101 is stopped and the moving of the display region is stopped. Thereby since the moving signal becomes "not moving", the change controller 79 returns the changers 77, 78 to the side of the contact A so that the R signals based on the B mode data and the CFM data are supplied to the image display 8. Also in the G signal generator 702 and the B signal generator 703, similar operation is carried out.

As a result, as shown in FIG. 5, the blood flow at the portion securely recognized as the tumor image 83 is displayed in the blood display region 84. That is, effect is obtained in that the blood flow at the desired portion can be displayed securely.

In addition, the display means is not limited to that where the image is color-displayed by the RGB signal as in the embodiment, but the display means carrying out the color display by other plural color element signals will do. Further even the display means displaying the blood flow not by color but by tone of monochrome or specific pattern (hatching or the like) belongs to scope of the display means in the present invention.

Also the moving means is not limited to the track ball as in the embodiment, but various sorts of operation tools for the figure moving, such as a mouth, a joy stick, a cursor key, a touch panel or the like, are included in scope of the moving means in the present invention.

Also the display changing means is not limited to the micro computer or the like comprising the changers 77, 78 and the changing controller 79 having hardware or software of the same function as in the embodiment. The display changing means, in short, may be that changing the display mode of the screen into the B-mode display while the blood flow display region is moved, and the display changing means having this function is included in scope of the display changing means in the present invention.

As above described in detail, in the present invention, since the B-mode image is displayed within the blood flow display region while the blood flow display region is moved, the B-mode image is displayed in the blood flow display region while the blood flow display region is moved and the blood flow image is displayed in the blood flow display region when the moving is stopped. Therefore effect is obtained in that the B-mode image of the target can be easily caught even while the blood flow display region is moved.

What is claimed is:

1. A method for ultrasonic blood flow display where a blood flow image by power of an ultrasonic Doppler signal is displayed to a blood flow display region movable within a B-mode image display region, characterized in that the B-mode image is displayed within said blood flow display region while said blood flow display region is moved.

2. An apparatus for ultrasonic blood flow display, comprising:

B-mode image forming means for forming a B-mode image based on an ultrasonic echo signal;

blood flow image forming means for forming a blood flow image based on power of an ultrasonic Doppler signal;

display means for displaying the B-mode image formed by said B-mode image forming means, and for displaying the blood flow image formed by said blood flow image forming means to a blood flow display region formed within a B-mode image display region;

moving means for moving said blood flow display means; and display changing means for displaying the B-mode image within said blood flow display region while said blood flow display region is moved.

\* \* \* \* \*

UNITED STATES PATENT AND TRADEMARK OFFICE
CERTIFICATE OF CORRECTION

PATENT NO. : 5,584,294
DATED : December 29, 1998
INVENTOR(S) : HIROSAWA et al

It is certified that error appears in the above-identified patent and that said Letters Patent is hereby corrected as shown below:

Col. 12, line 51, delete "extension" and insert –extrusion–.

Signed and Sealed this

Twenty-ninth Day of May, 2001

Attest:

NICHOLAS P. GODICI

*Attesting Officer*  *Acting Director of the United States Patent and Trademark Office*

UNITED STATES PATENT AND TRADEMARK OFFICE
CERTIFICATE OF CORRECTION

PATENT NO. : 5,584,294
DATED : December 17, 1996
INVENTOR(S) : Shinichi Amemiya, et al.

It is certified that error appears in the above-identified patent and that said Letters Patent is hereby corrected as shown below:

This certificate supercedes certificate of correction issued May 29, 2001, the number was erroneously mentioned and should be deleted since no Certificate of Correction was granted.

Signed and Sealed this

Twenty-first Day of August, 2001

*Attest:*

NICHOLAS P. GODICI
*Attesting Officer*     *Acting Director of the United States Patent and Trademark Office*